(12) United States Patent
Cesano

(10) Patent No.: US 7,186,105 B2
(45) Date of Patent: Mar. 6, 2007

(54) APPARATUS AND METHOD FOR PRODUCING AN ARTICLE MADE OF THERMOPLASTIC AND THERMOSETTING MATERIALS

(75) Inventor: Franco Cesano, S. Secondo di Pinerolo (IT)

(73) Assignee: CRS SRL Centro Ricerche E Sperimentazioni, Frossasco (IT)

( * ) Notice: Subject to any disclaimer, the term of this patent is extended or adjusted under 35 U.S.C. 154(b) by 415 days.

(21) Appl. No.: 10/628,483

(22) Filed: Jul. 29, 2003

(65) Prior Publication Data
US 2005/0023724 A1 Feb. 3, 2005

(51) Int. Cl.
*B29C 69/02* (2006.01)
(52) U.S. Cl. .................... 425/112; 425/127
(58) Field of Classification Search ........... 425/112, 425/127; 264/266, 274, 294
See application file for complete search history.

(56) References Cited

U.S. PATENT DOCUMENTS 2,607,957 A * 8/1952 Danielson et al. .......... 425/112
2,609,570 A * 9/1952 Danielson et al. .......... 425/112
4,088,729 A   5/1978 Sherman
4,418,031 A   11/1983 Doerer et al.
5,008,060 A * 4/1991 Kanai et al. ................ 264/274
5,091,131 A   2/1992 Schumacher et al.
5,902,533 A   5/1999 Munger et al.
6,139,975 A * 10/2000 Mawatari et al. .......... 264/274

FOREIGN PATENT DOCUMENTS

DE  197 33 598 A1  2/1999
EP  1 153 725 A1   11/2001
EP  1 226 923 A1   7/2002

* cited by examiner

*Primary Examiner*—Robert B. Davis
(74) *Attorney, Agent, or Firm*—Sughrue Mion, PLLC

(57) ABSTRACT

An apparatus for moulding an article made of thermosetting and thermoplastic material, including a first and a second half-mould (10, 12) provided with respective compression moulding surfaces (14, 16) above to compress between them one or more plates (30), sandwich or agglomerate, made of mouldable thermosetting material (30), and at least one injection moulding area (18) communicating with at least one of said compression moulding surfaces (14, 16), and spacer means (22) provided in said injection moulding area (18) and positioned in such a way as to prevent said plate (30) from penetrating into said injection moulding area (18) when it is compressed between said compression moulding surfaces (14, 16).

5 Claims, 3 Drawing Sheets

APPARATUS AND METHOD FOR PRODUCING AN ARTICLE MADE OF THERMOPLASTIC AND THERMOSETTING MATERIALS

BACKGROUND OF THE INVENTION

The present invention relates to an apparatus and a method for producing an article made of thermoplastic and thermosetting materials.

The invention was developed in particular for the production of articles formed by compression moulding of one or more plates, or sandwich, between two heated half-moulds provided with respective compression moulding surfaces. For the production of articles made of thermosetting material, plates or sheets constituted by fibres incorporated in a thermosetting resin, initially in the viscous or plastic state, are used. The material in sheet or plate form is compressed between the compression moulding surfaces of two half-moulds, movable with respect to one another between an open position and a closed position. During compression in the mould, the thermosetting material is heated in contact with the two half-moulds, until obtaining the polymerisation and hardening of the thermosetting resin.

In many technical sectors, in particular in the automotive industry, there is a need to provide reinforcing areas or fastening materials made of thermoplastic material on one or more faces of an article made of thermosetting material obtained by compression moulding. Current technology for the production of articles for the automotive industry obtained by compression moulding a thermosetting material, requires separately to produce by injection moulding reinforcing organs or fastening organs which, in a step following the thermo-compression moulding of the thermosetting material, are fastened onto one or more faces of the article made of thermosetting material by gluing, welding or by mechanical fastening means.

In the sector of moulding of articles made of compression moulded thermoplastic material, a method has already been proposed for forming by means of injection moulding a component anchored onto a surface of a plate made of thermoplastic material whilst said plate is compression moulded between two mutually facing surfaces of two half-moulds. For instance, the document EP-A-1153735 by the same Applicant discloses a method and an apparatus which provide an injection moulding cavity obtained in one of the two half-shells and which terminates on the compression moulding surface of the same half-shell by means of a restricted section to prevent the injection moulded material from damaging the compression moulded plate.

However, this technology cannot be immediately transferred to the sector of thermo-compression moulding of articles made of thermosetting materials, especially if an injection moulded component is to be formed on an extended surface portion of an article made of thermosetting material, due to the different behaviour of thermosetting materials with respect to thermoplastic materials during compression moulding.

SUMMARY OF THE INVENTION

The object of the present invention therefore is to provide an enhanced apparatus and a method for producing an article made of thermosetting material by compression moulding and simultaneous forming of auxiliary components made of thermoplastic material by means of injection moulding.

According to the present invention, said object is achieved by an apparatus and by a method having the characteristics set out in the claims.

BRIEF DESCRIPTION OF THE DRAWINGS

The present invention shall now be described in detail with reference to the accompanying drawings, provided purely by way of non limiting example, in which.

DETAILED DESCRIPTION OF THE INVENTION

Figure 1:
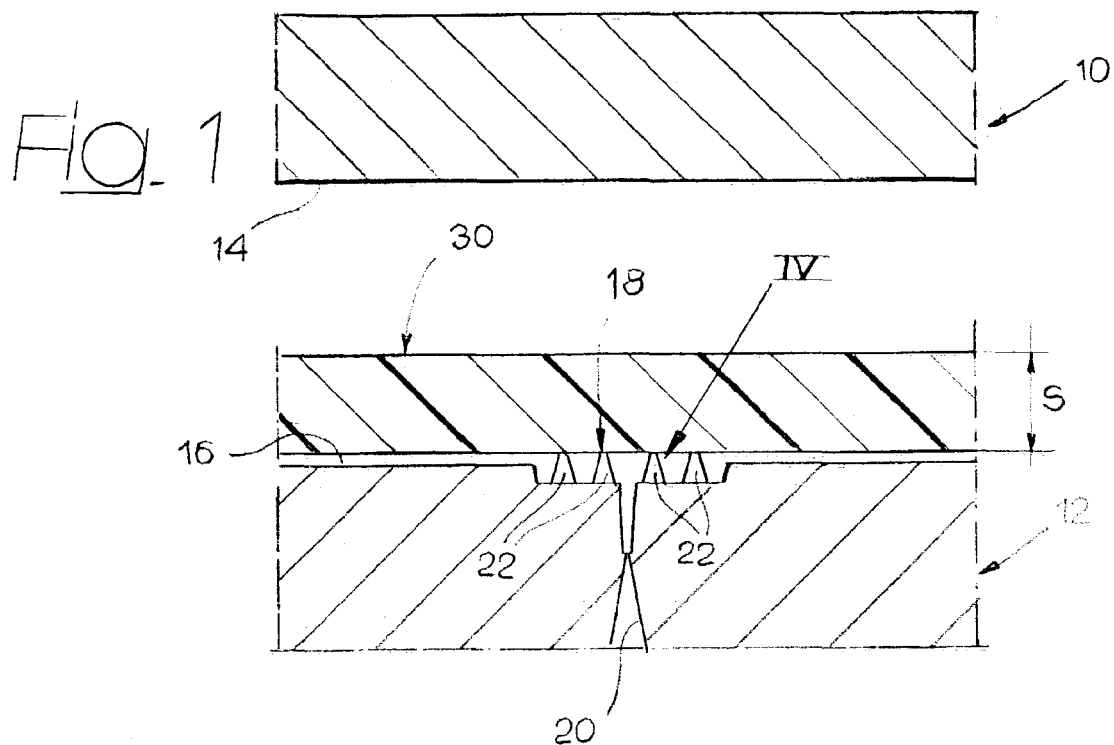
FIGS. 1 through 3 are schematic views showing three steps of a method according to the present invention.
Figure 2:
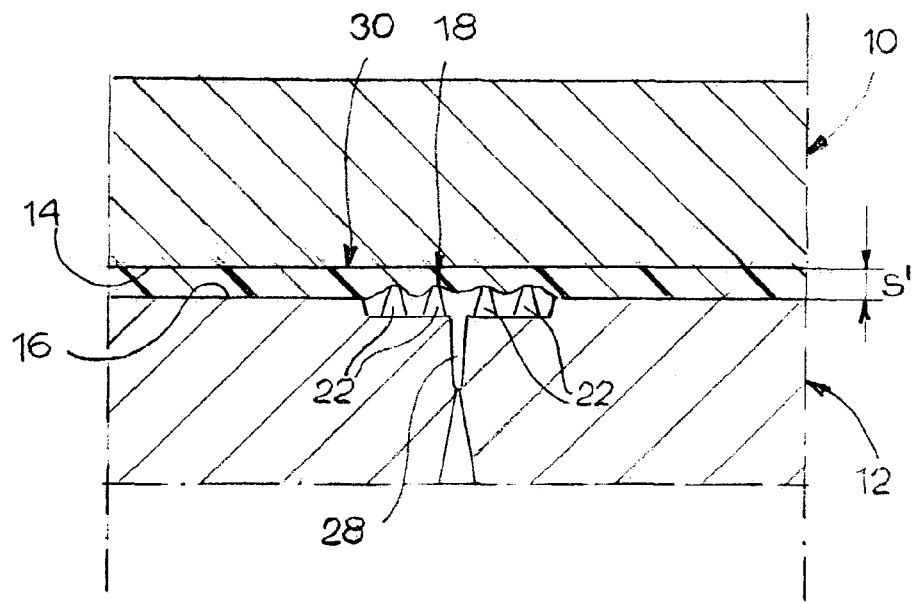
Figure 3:
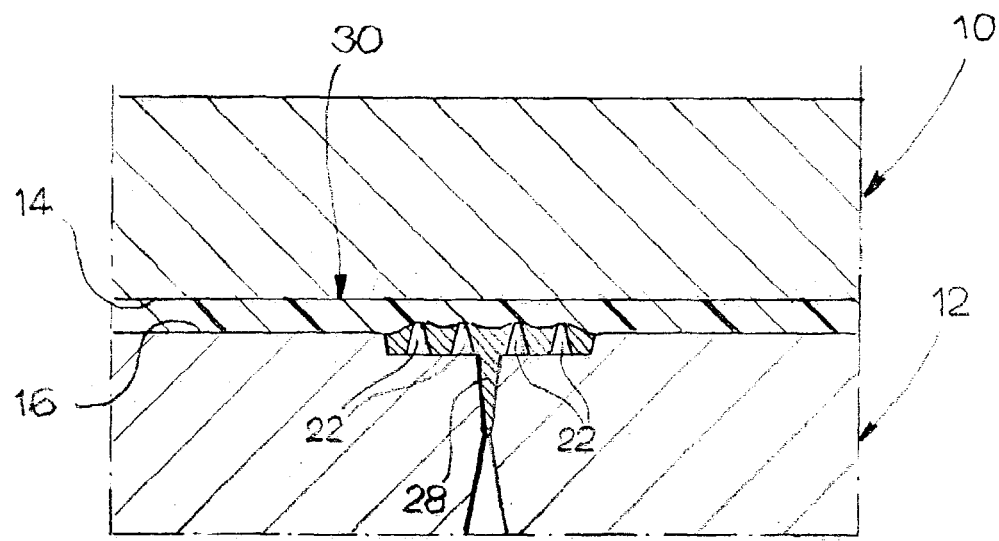

With reference to FIGS. 1 through 3, the reference numbers 10 and 12 schematically designate two half-moulds of a compression moulding apparatus, in particular for thermo-compression moulding of thermosetting plastic material. The half-moulds 10, 12 are provided with respective moulding surfaces 14, 16 and are movable between an open position shown in FIG. 1 and a closed position shown in FIGS. 2 and 3. The half-moulds 10, 12 are made of metallic material and are provided with known heating means (not shown) able to bring the half-moulds to a temperature that is equal to or greater than the polymerisation temperature of the material to be moulded.

Figure 4:
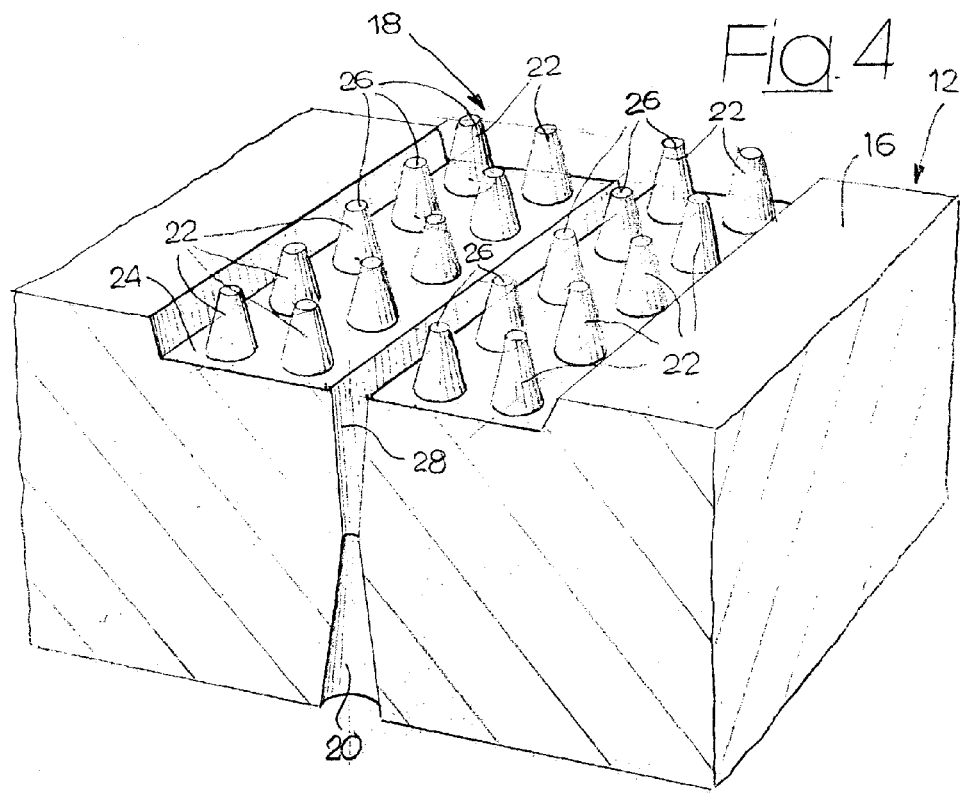
FIG. 4 is a schematic perspective view of the part designated by the arrow IV in FIG. 1.

With reference in particular to FIG. 4, in at least one of the two half-moulds 10, 12, for instance on the lower half-mould 12, is obtained at least an injection moulding area designated as 18. The injection moulding area 18 communicates with the moulding surface 16 and is in fluid communication with at least an injection channel 20 connected with an apparatus for injecting plastic material under pressure (not shown). According to the present invention, the injection moulding area 18 comprises a plurality of spacer elements 22 positioned in such a way as to prevent the material to be moulded by thermo-compression between the surfaces 14, 16 of the half-moulds 10, 12 from filling the injection moulding area 18. In the embodiment illustrated purely by way of example in the figures, the injection moulding area 18 comprises a bottom surface 24 which is lowered relative to the moulding surface 16 and wherefrom project a plurality of spacer elements 22, for instance pivot shaped, preferably integral with the half-mould. The spacer elements 22 have respective upper support surfaces 26 which can extend above or below a plane tangential to the moulding surface 16. The injection moulding area 18 can be provided with seats or cavities destined to be filled with injected plastic material. In the example illustrated in the figures, the injection moulding area is provided with a groove 28 with V-shaped cross section whose base terminates on the bottom surface 24 of the injection moulding area 18 and whose vertex communicates with at least one injection channel 20. The shape of the seats or cavities provided in the injection moulding area 18 may vary on a case by case basis and it will be complementary to that of the component or of the components to be formed by injection moulding.

With reference to FIG. 1, in the first operative step of the method according to the invention one or more plates 30 of thermosetting material in the plastic state are positioned between the half-moulds 10, 12 in open position. It should be understood that reference herein to a plate of thermosetting material always includes the use of two or more plates or of so-called sandwiches or agglomerates, well known in the sector of moulding components made of thermosetting material. The initial thickness of the plate of thermosetting material 30 is designated as S.

In a second operative step schematically illustrated in FIG. 2, the half-moulds 10, 12 are closed and the plate of thermosetting material 30 is compressed between the compression moulding surfaces 14, 16 until reaching a thickness S' which is considerably smaller than the initial thickness S. As shown in FIG. 2, the spacer elements 22 serve the purpose of preventing, during the compression of the plate of thermosetting material 30 from the initial thickness S to the final thickness S2, the material constituting the plate 30 from penetrating into the injection moulding area 18 and filling the volume which is destined to be filled by injected material. The shape, the dimensions and the number of the spacer elements 22 may vary according to the shape and to the dimensions of the injection moulding area 18 and according to the type of material constituting the plate 30 and of the degree of compression whereto the plate is subjected.

In the operative step schematically shown in FIG. 2, the plate of thermosetting material 30 heats up in contact with the half-moulds 10, 12 until the polymerisation temperature of the thermosetting resin is reached. Simultaneously or after a sufficient time to achieve conditions of partial or total hardening of the plate 30, some thermoplastic material is injected into the injection moulding area 18 through the injection channel or channels 20. The thermoplastic material is injected at a temperature that is considerably greater than the temperature of the half-moulds 10, 12. For instance, the half-moulds 10, 12 can be heated to a temperature in the order of 110–130° C. whilst the thermoplastic material is injected into the injection moulding area 18 at a temperature for example in the order of 220–230° C. The material injected into the injection moulding area 18 cools in contact with the walls which define the injection moulding area 18 to a temperature that allows to obtain a sufficient compactness of the injection plastic material, such that it will maintain its own shape. FIG. 3 shows the injection moulding step which takes place immediately or whilst the at least partially hardened thermoplastic plate 30 is compressed between the half-moulds 10, 12. At the end of the injection and partial cooling and hardening of the injected thermoplastic material, the half-moulds 10, 12 are opened and the finished article is extracted.

Figure 6:
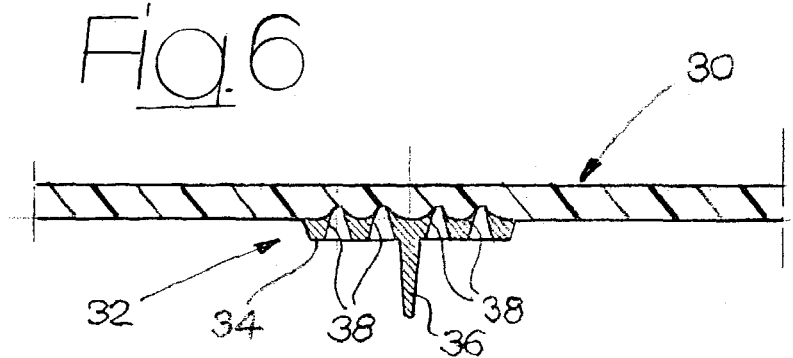
FIGS. 6 and 7 are a section and a plan view according to the line VI—VI and according to the arrow VII of FIG. 5.
Figure 7:
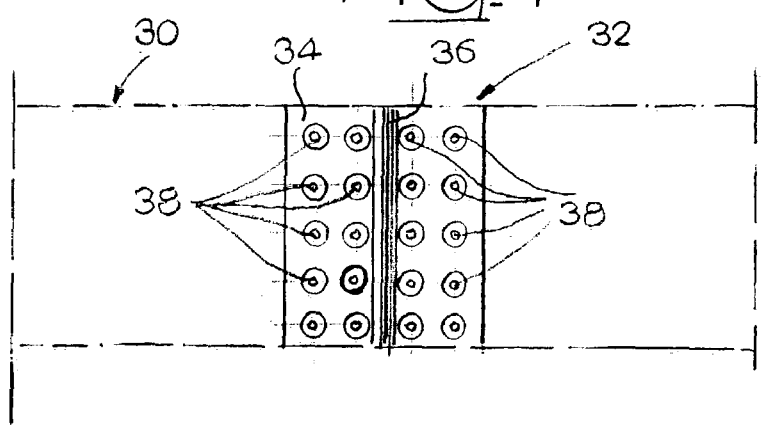
Figure 5:
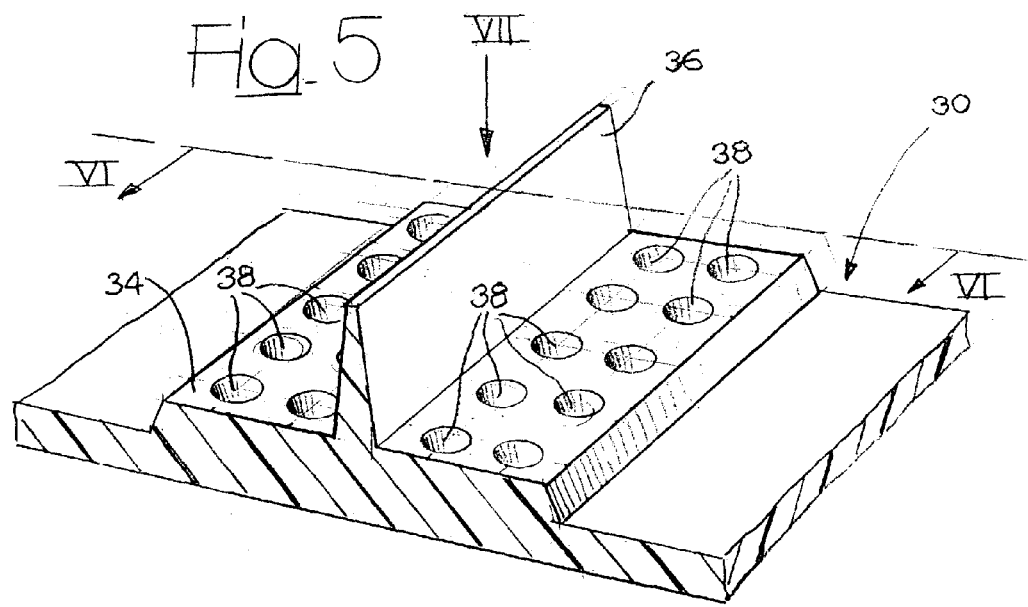
FIG. 5 is a schematic perspective view of an article obtained with the method according to the invention.

FIGS. 5, 6 and 7 schematically show the article obtained at the end of the moulding method according to the present invention. Said article comprises one or more plates, sandwich or agglomerate, 30 of thermosetting material moulded by thermo-compression and at least an injection moulded component 32 integrally formed on a surface of the plate 30. The component 32 has a shape complementary to that of the injection moulding area 18 and, in the example shown in the figures, it comprises a base 34 wherefrom projects a rib 36 with V-shaped section. On the base 34 are formed a plurality of holes 38 in correspondence with the spacer elements 22.

What is claimed is:

1. An apparatus for moulding an article made of thermosetting and thermoplastic material, comprising:
   a first and a second half-mould provided with respective compression moulding surfaces facing one another and being able to compress between them at least one plate of mouldable thermosetting material, and
   at least one injection moulding area into which thermoplastic material is injected, the injection moulding area comprising a chamber communicating with at least one of said compression moulding surfaces,
   spacer means provided in said injection moulding area, extending inside said chamber and positioned in such a way as to prevent said plate from penetrating into said injection moulding area when it is compressed between said compression moulding surfaces;
   wherein each of the compression moulding surfaces comprises at least one surface other than the spacer means.

2. An apparatus as claimed in claim 1, wherein said spacer means are integral with one of said half-moulds and project from at least one surface of said injection moulding area.

3. An apparatus as claimed in claim 1, wherein said spacer means comprise a plurality of pin-shaped elements projecting from a bottom surface of said injection moulding area.

4. An apparatus as claimed in claim 3, wherein said pin-shaped projecting elements have respective support surfaces destined to come in contact with a surface of said plate.

5. An apparatus as claimed in claim 1, wherein a compression moulding volume in which the plate is compressed is defined between the compression moulding surfaces,
   wherein the injection moulding chamber is formed in one of the half moulds, is recessed with respect to the compression moulding surface of the half mould in which it is formed and is open into the compression moulding volume; and
   wherein the spacer means extend from a bottom surface of the injection moulding chamber and project into the compression moulding volume.

* * * * *